US008830907B2

(12) United States Patent
Melis et al.

(10) Patent No.: US 8,830,907 B2
(45) Date of Patent: Sep. 9, 2014

(54) METHOD OF PROCESSING RECEIVED SIGNALS, CORRESPONDING RECEIVER AND COMPUTER PROGRAM PRODUCT THEREFOR

(75) Inventors: Bruno Melis, Turin (IT); Rosalba Campanale, Turin (IT); Alfredo Ruscitto, Turin (IT); Federica Caldara, Turin (IT)

(73) Assignee: Telecom Italia S.p.A., Milan (IT)

( * ) Notice: Subject to any disclaimer, the term of this patent is extended or adjusted under 35 U.S.C. 154(b) by 398 days.

(21) Appl. No.: 13/062,184

(22) PCT Filed: Sep. 4, 2008

(86) PCT No.: PCT/EP2008/007239
§ 371 (c)(1),
(2), (4) Date: Mar. 3, 2011

(87) PCT Pub. No.: WO2010/025749
PCT Pub. Date: Mar. 11, 2010

(65) Prior Publication Data
US 2011/0158180 A1 Jun. 30, 2011

(51) Int. Cl.
H04W 4/00 (2009.01)
H04B 7/08 (2006.01)
H04B 1/712 (2011.01)
H04B 1/7105 (2011.01)

(52) U.S. Cl.
CPC .............. H04B 7/0845 (2013.01); H04B 1/712 (2013.01); H04B 1/71055 (2013.01)
USPC ........................................................ 370/328

(58) Field of Classification Search
USPC .......... 708/520; 375/347, 140, 299, 130, 267; 455/562.1; 370/328; 342/373
See application file for complete search history.

(56) References Cited
U.S. PATENT DOCUMENTS 6,141,393 A * 10/2000 Thomas et al. ............... 375/347
6,377,611 B1 * 4/2002 Hwang ........................ 375/140

(Continued)

FOREIGN PATENT DOCUMENTS

EP 1 359 684 A1 11/2003
WO WO 03/023988 A1 3/2003

OTHER PUBLICATIONS

Shubair; "Robust Adaptive Beamforming Using LMS Algorithm With SMI Initialization", IEEE Antennas and Propagation Society International Symposium, vol. 4A, pp. 2-5, (2005).
"Complexity Comparison of OFDM HS-DSCH Receivers and Advanced Receivers for HSDPA and Associated Text Proposal", Nortel Networks, 3GPP TSG-RAN-1 Meeting #34, R1-031085, pp. 1-17, (2003).

(Continued)

Primary Examiner — Andrew Lai
Assistant Examiner — Jamaal Henson
(74) Attorney, Agent, or Firm — Finnegan, Henderson, Farabow, Garrett & Dunner, L.L.P.

(57) ABSTRACT

Signals received from channels exposed to multi-path propagation via a plurality of diversity antennas and including at least one pilot signal are processed by detecting a set of multi-path components for each received signal and computing a set of channel coefficients from multi-path components of the at least one pilot signal in the set of multi-path components. The set of channel coefficients is organized as a channel coefficient vector. From the channel coefficient vector, a set of combining weights is estimated to be applied to the received signals by: computing a spatial correlation matrix of the channel coefficient vector by neglecting the correlations between multi-path components of the channel coefficient vector having different delays, whereby the correlation matrix is a block diagonal matrix including null coefficients other than for non-null sub-matrixes arranged along the diagonal of the correlation matrix, wherein the sub-matrixes have a size equal to the number of diversity antennas; deriving from the spatial correlation matrix a resulting matrix by calculating the inverse of the sub-matrixes or a scaled version thereof; and multiplying the resulting matrix and the channel coefficient vector in order to obtain the desired set of combining weights.

13 Claims, 5 Drawing Sheets

(56) References Cited

U.S. PATENT DOCUMENTS

| | | | |
|---|---|---|---|
| 7,003,542 B2 * | 2/2006 | Devir ............................ | 708/520 |
| 7,248,645 B2 * | 7/2007 | Vialle et al. ................... | 375/299 |
| 2005/0117660 A1 | 6/2005 | Vialle et al. | |
| 2007/0104254 A1 * | 5/2007 | Bottomley et al. ........... | 375/148 |
| 2009/0046009 A1 * | 2/2009 | Fujii ............................. | 342/373 |

OTHER PUBLICATIONS

International Search Report from the European Patent Office for International Application No. PCT/EP2008/007239, mailing date Jun. 5, 2009.

* cited by examiner

METHOD OF PROCESSING RECEIVED SIGNALS, CORRESPONDING RECEIVER AND COMPUTER PROGRAM PRODUCT THEREFOR

CROSS REFERENCE TO RELATED APPLICATION

This application is a national phase application based on PCT/EP2008/007239, filed Sep. 4, 2008, the content of which is incorporated herein by reference.

FIELD OF THE INVENTION

This disclosure relates to communication technology.

Specifically, this disclosure concerns receive antenna diversity techniques.

DESCRIPTION OF THE RELATED ART

High Speed Downlink Packet Access (HSDPA) was standardized in 2002, as a part of Third Generation Partnership Project (3GPP) Release 5 specifications, with the purpose of improving downlink spectral efficiency for packet data transmission.

Basically, HSDPA introduces a new common High Speed Downlink Shared Channel (HS-DSCH), which is shared by all the users in a particular sector. In addition, HSDPA introduces certain mechanisms that enable high speed packet data transmission at the physical layer such as e.g. a short Transmission Time Interval (TTI) of 2 ms, Adaptive Modulation and Coding (AMC), fast retransmission based on hybrid Automatic Repeat request (H-ARQ) techniques and a centralized scheduler located in the Node B (i.e. the base station).

An element implementing HSDPA is the centralized scheduler located in the Base Station (Node B). The scheduler determines, for each TTI, the terminal (or terminals) towards which the HS-DSCH should be transmitted and thanks to the adaptive choice of modulation and coding (AMC) the achievable data rate for that user. One important change of the HS-DSCH, with respect to Release 99 channels, is that the scheduler is located at the Node B as opposed to the Radio Network Controller (RNC). In conjunction with the short TTI and the Channel Quality Indicator (CQI) feedback from the User Equipment (UE), this enables the scheduler to quickly track the UE channel condition by adapting the data rate allocation accordingly.

Within each TTI of length 2 ms, a constant Spreading Factor (SF) of 16 may be used for code multiplexing, with a maximum of 15 parallel codes allocated to the HS-DSCH. These codes may all be assigned to one user during the TTI, or may be split across several users. The number of parallel codes allocated to each user may depend e.g. on the cell load, Quality of Service (QoS) requirements and the UE code capabilities (5, 10 or 15 codes).

The peak data rate achievable by the first HSDPA terminals was 1.8 Mbit/s corresponding to the support of up to 5 parallel codes in the presence of Quadrature Phase-Shift Keying (QPSK) modulation. With the improvements of signal processing capabilities, the HSDPA terminals available on the market supported also Quadrature Amplitude Modulation (16-QAM) and more than 5 codes. Potentially, HSDPA may provide a peak throughput of 14.4 Mbit/s that will be increased in future through the adoption of multi-antenna transmission techniques, such as Multiple-Input Multiple-Output (MIMO) systems, and higher order modulations, such as 64-QAM modulation, foreseen in the Releases 7 and 8 of the 3GPP specifications.

In order to support the HS-DSCH operations, two control channels have been added: the High-Speed Shared Control Channel (HS-SCCH) in downlink and the High-Speed Dedicated Physical Control Channel (HS-DPCCH) in uplink.

The HS-SCCH channel carries the key information necessary for HS-DSCH demodulation. Currently, the HS-SCCH channel is a fixed rate common channel with spreading factor SF=128 transmitted two slots in advance with respect to the correspondent HS-DSCH TTI, as shown in FIG. 1.

Each frame F of the HSDPA downlink channels (i.e. HS-SCCH and HS-DSCH) comprises five blocks B, wherein each block B in turn comprises three slots S. The three-slot duration of each block B is divided into two functional parts P1 and P2 for the HS-SCCH. The first part, i.e. P1, contains time critical parameters such as the set of spreading codes and the modulation scheme (QPSK or 16-QAM) used by the HS-DSCH. The second part, i.e. P2, contains information that is less time critical such as the Transport Block Size (TBS), the redundancy version (e.g. chase combining or incremental redundancy), the H-ARQ process number and the UE Identity (UE ID) indicating to which terminal the information is addressed.

Typically, each terminal monitors at most four HS-SCCHs at a given time and the HS-SCCHs being considered are signalled to the terminal through the network.

The HSDPA system is based on the Code Division Multiple Access (CDMA) technique and thus exploits a unitary frequency reuse over the different cells. The co-channel interference is therefore one of the key factors that limit the throughput performance of a HSDPA network. Co-channel interference may be generated by both the users served from the same cell (intra-cell interference) and the users served by neighbouring cells (inter-cell interference).

Intra-cell interference may arise in the presence of multipath propagation (frequency selective channels), because it may reduce the spreading code orthogonality. Typically, the maximum of the intra-cell interference is experienced by users near to the serving base station, where the channels of the other users and the control channels are received with the maximum power.

The inter-cell interference may be a function of the network load and is usually highest for the users located at the cell boundaries, where the power received from the neighbouring cell is usually larger.

For these reasons, 3GPP has defined several classes of advanced receivers that provide better performance than the classical Rake receiver in order to improve the throughput performance of HSDPA. These advanced receivers are equipped with signal processing functionalities that reduce the effect of co-channel interference. In particular, the "advanced" HSDPA receivers may be divided into three main classes:

Type 1 receivers, equipped with receive antenna diversity;
Type 2 receiver, equipped with chip level equalization;
Type 3 receivers, equipped with both receive antenna diversity and chip level equalization.

Receive antenna diversity (Type 1 and Type 3 receivers) may be useful for the mitigation of inter-cell interference. A chip level equalizer (Type 2 and Type 3 receivers) that tries to flatten the equivalent frequency response of the channel may be useful for reducing the intra-cell interference.

Type 1 receiver typically comprise a dual-antenna subsystem, i.e. two RF receivers (including two A/D converters), and a baseband processing unit comprising a Rake receiver.

Typically, each antenna has allocated thereto K fingers and the total number of fingers allocated in a Type 1 receiver is usually N=2 K. Subsequently, a baseband processing unit is able to combine the signals received by the different fingers of the Rake receiver by means of a set of combining coefficients.

Several techniques have been proposed in literature for calculating these combining coefficients. For example, in commercial HSDPA modems Maximum Ratio Combining (MRC) is widely used.

Recently, some chipset vendors are considering the introduction of more complex combining methods that reduce the inter-cell interference. In particular, the Minimum Mean Square Error (MMSE) combining technique seems to be the preferred solution, because it maximizes the signal to interference plus noise ratio (SINR) at the combiner output.

In this context, document WO-A-03/023988 describes the architecture of a double antenna Rake receiver with MMSE combining. The MMSE weights are calculated considering simultaneously M·L received echoes, where M≥2 is the number of receiving antennas and L is the number of echoes for each antenna. The correlation matrix of the received signal, with size (M·L)×(M·L), is estimated by means of the pilot symbols after de-spreading. The MMSE algorithm is implemented by performing the direct inversion of the correlation matrix or by using iterative procedures such as the Least Mean Squares (LMS) or the Normalized Least Mean Squares (NLMS) technique, which is trained with the reference pilot symbols.

Document R. M. Shubair, "Robust adaptive beamforming using LMS algorithm with SMI initialization", IEEE Antennas and Propagation Society International Symposium, Vol. 4A, pages 2-5, 3-8 Jul. 2005, describes an initialization method for accelerating the convergence of the LMS algorithm. The initial weight vector to be used in the LMS update equation is calculated using the Sample Matrix Inversion (SMI) technique, which is a block-data oriented method. After an estimate of the initial weights has been made with the SMI technique, the combined LMS/SMI procedure uses a continuous approach to adapt itself to the changing signal environment by updating the weights for every incoming signal sample.

OBJECT AND SUMMARY OF THE INVENTION

In respect of the various combining techniques and algorithms eligible for use in the context outlined in the foregoing, the inventors have noted the following:
- the Maximum Ratio Combining (MRC) technique exhibits an inherent low complexity but is almost ineffective in producing any kind of inter-cell interference rejection. As a consequence, MRC combining may be sub-optimal in terms of radio link performance in the presence of correlated interfering signals having a precise arrival direction;
- the Minimum Mean Square Error (MMSE) technique achieves better performance, but requires the inversion of a correlation matrix, which may render its implementation complex;
- the Least Mean Square (LMS) algorithm converges slowly if compared with other more complex algorithms: for instance, the Sample Matrix Inversion (SMI) algorithm has a fast convergence behaviour;
- the SMI algorithm is computationally intensive, because its rapid convergence is achieved through the use of matrix inversion operations; moreover, the SMI algorithm has a block adaptive approach, which requires that the signal environment is not affected by significant changes during the block acquisition operation;
- the LMS algorithm may converge faster if a meaningful initialization is used.

The object of the invention is thus to provide, within the context considered in the foregoing, a technique for estimating the combining coefficients of a baseband processing unit with performance comparable to the Minimum Mean Square Error technique, but with a lower complexity.

According to the present invention, that object is achieved by means of a method having the features set forth in the claims that follow. The invention also relates to corresponding receiver as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The claims are an integral part of the disclosure of the invention provided herein.

An embodiment of the arrangement described herein relates to techniques for calculating the combining coefficients of a baseband processing unit in a receive antenna diversity system. For example, such combining coefficients may be used in a Rake receiver, having N fingers allocated to the receive antennas, wherein each finger is allocated to one multi-patch component (i.e. replica or echo) of the received signal.

In an embodiment, support for multiple OVSF (Orthogonal Variable Spreading Factor) codes of the HS-DSCH channel is achieved (for example 5 or 10 OVSF codes) by providing for each OVSF code N fingers. OVSF codes are used in the UMTS/HSPA system for spreading the symbols transmitted on the different data and control channels. These codes are derived from an OVSF code tree that reflects the construction of Hadamard matrices. Each data or control channel is assigned to one or more OVSF codes that are orthogonal to the codes assigned to other channels.

In an embodiment, a correlation matrix $\underline{R}_r$ is estimated by means of the pilot symbols transmitted e.g. on the Common Pilot Channel (CPICH).

In an embodiment, an approximation of the correlation matrix $\underline{R}_r$ is used, which may be inverted avoiding complex operations.

In an embodiment, the correlation matrix $\underline{R}_r$ is approximated by neglecting the correlations between echoes that have different delays and this approximation is applied to echoes received on both the same and on different antennas. This approximation renders the correlation matrix $\underline{R}_r$ a block diagonal matrix, which may be inverted with simple mathematical operations.

In an embodiment, an HSDPA system with two receive antennas is used and the same number of fingers K=N/2 is allocated to each receive antenna. In this case, the approximated correlation matrix is formed by K sub-blocks of size 2×2, wherein K is the number of received echoes.

In an embodiment, the sub-blocks are inverted by performing only sign inversions and element swapping (i.e. avoiding any division by the determinant of the sub-block).

The inverse of the approximated correlation matrix is then multiplied by a vector $\underline{s}_d$, representing the cross correlation between the received signal vector and the conjugate of the reference transmitted symbols, in order to obtain the MMSE approximated weights.

In an embodiment, the correlation matrix $\underline{\underline{R}}_r$ and the elements of the vector $\underline{s}_d$ are estimated by averaging coefficients over a time interval, such as one TTI.

These weights may then be combined with the data symbols of e.g. the HS-DSCH channel obtained after de-spreading.

In an embodiment, the calculation of the combining weights is performed at symbol level (i.e. after the de-spreading operation) by using the pilot symbols after de-spreading, but the combination of the different multi-path components is performed at chip level (i.e. before the de-spreading operation).

In an embodiment, the weights calculated with the approximated MMSE technique are used to initialize a Least Mean Square (LMS) or Normalized Least Mean Square (NLMS) iterative procedure.

In an embodiment, a NLMS procedure is used, which operates at chip level directly on the signals provided at the output of the digital front-ends and also the combining operations are performed at chip level. Those skilled in the art will appreciate that the same concepts may also be applied when the LMS procedure and/or the combining operations are performed at symbol level.

In an embodiment, the calculation of the approximated MMSE weights and a number of iterations of the NLMS procedures are performed before any data is received. For example, the calculations may start immediately with the receipt of the first slot on the HS-SCCH before any data is received on the HS-DSCH. Contemporarily with the beginning of the demodulation of the HS-DSCH, the NLMS procedures may then track the channel variations by updating the weights.

BRIEF DESCRIPTION OF THE ANNEXED DRAWINGS

The invention will now be described, by way of example only, with reference to the enclosed figures of drawing, wherein:

FIG. 1 has already been discussed in the foregoing;

DETAILED DESCRIPTION OF PREFERRED EMBODIMENTS OF THE INVENTION

Figure 1:
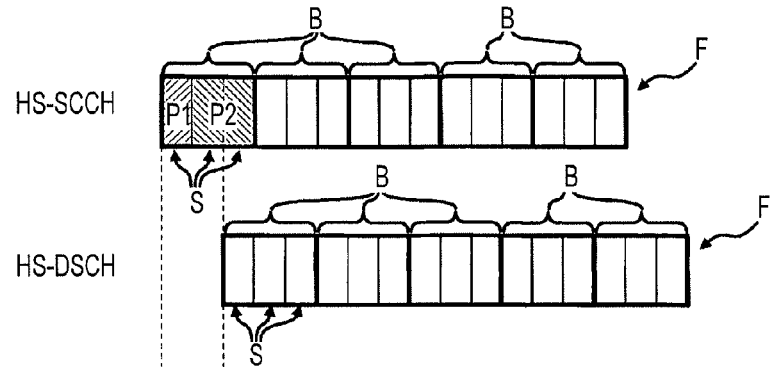

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

More to the point, while reference will be made throughout this description primarily to HSDPA systems (i.e. two receive antennas), those of skill in the art will appreciate that no specific limitations are made to the HSDPA communication standard or UMTS at all. In fact, the mechanisms disclosed herein may be used in any communication scenario having receive antenna diversity.

In the following mathematical equations the operator $(.)^*$ will be used to denote complex conjugation, while the operator $(.)^H$ denotes the transpose and conjugation operations. Generally, vectors are represented as underlined characters in boldface, while matrices are double underlined and in boldface.

Exact MMSE Combining

In manner largely known per se, in the case of signal reception based on a MMSE algorithm, a MMSE weights vector may be calculated by minimizing the Mean Square Error (MSE) between the output of the combining unit and the transmitted symbols. By denoting with J the MSE it is possible to write $$J = E\{|s - \underline{w}^H \underline{r}|^2\} = E\{(s - \underline{w}^H \underline{r})(s - \underline{w}^H \underline{r})^H\} \quad (1)$$
$$= E\{|s|^2 - s\underline{r}^H \underline{w} - \underline{w}^H \underline{r}s^* + \underline{w}^H \underline{r}\underline{r}^H \underline{w}\}$$

where s is the transmitted signal, $\underline{r}$ is the received signal and $\underline{w}=[w_1\ w_2\ \ldots\ w_N]^T$ is the MMSE weight vector. The received signal vector $\underline{r}$ may be written by stacking the symbols $r_j$ (with $1 \leq j \leq N$) demodulated by the N fingers allocated to the two antennas $$\underline{r}=[r_1\ r_2\ \ldots\ r_N]^T=\underline{c}s+\underline{n} \quad (2)$$

where $\underline{c}$ is a N×1 column vector containing the channel coefficients of the correspondent useful signal paths estimated for example by using the CPICH channel $$\underline{c}=[c_1\ c_2\ \ldots\ c_N]^T \quad (3)$$

and $\underline{n}$ is the N×1 undesired signal vector, which includes e.g. co-channel interference and thermal noise $$\underline{n}=[n_1\ n_2\ \ldots\ n_N]^T \quad (4)$$

where the elements of $\underline{n}$ have zero mean and variance $\sigma_n^2$.

The output of the combiner in the baseband processing unit may be expressed as $$y=\underline{w}^H \underline{r} \quad (5)$$

where $\underline{w}$ is the MMSE combining vector $$\underline{w}=[w_1\ w_2\ \ldots\ w_N]^T \quad (6)$$

The optimum MMSE weight vector is obtained by equaling to zero the derivative of J and solving for $\underline{w}$ $$\nabla(J)=0 \Rightarrow \underline{w}_{opt}=\underline{\underline{R}}_r^{-1}\underline{s}_d \quad (7)$$

where $\underline{\underline{R}}_r=E\{\underline{r}\underline{r}^H\}$ is the correlation matrix of the received signal vector $\underline{r}$ and $\underline{s}_d=E\{s^*\underline{r}\}$ is the cross correlation between the received signal vector $\underline{r}$ and the conjugate of the reference transmitted symbols.

The expression of the correlation matrix $\underline{R}_r = E\{\underline{rr}^H\}$ may be further expanded and expressed as a function of useful signal correlation matrix and the interfering signal correlation matrix $$\underline{R}_r = E\{\underline{rr}^H\} = E\{(\underline{c}s+\underline{n})(\underline{c}s+\underline{n})^H\} \quad (8)$$

$$= E\{\underline{cc}^H|s|^2 + \underline{n}\,\underline{n}^H + \underline{c}s\underline{n}^H + \underline{n}\underline{c}^H s^*\} = \underline{R}_s + \underline{R}_n$$

where $\underline{R}_s = E(\underline{cc}^H|s|^2)$ is the useful signal correlation matrix and $\underline{R}_n = E(\underline{nn}^H)$ is the interference plus noise correlation matrix.

The MMSE technique exploits the knowledge of the interfering signal correlation matrix in order to reject the interfering signals and thus maximize the SINR after combining. This effect may be also visualized in the space domain by drawing the radiation diagram of the antennas. In general the MMSE technique tries to place a minimum of the radiation diagram in the directions of arrival of the interfering signals and a maximum in correspondence of the useful signal directions.

Approximated MMSE Technique

In an embodiment of this disclosure, an approximated MMSE technique is used in order to avoid complex inversions of the correlation matrix. The proposed technique has an implementation complexity similar to MRC combining but provides better performance in terms of average throughput.

The MMSE weight vector is calculated through the minimization of the MSE between the output of the combining unit and the transmitted signal, which is the desired output of the receiver. This leads to the following expression $$\underline{w}_{mmse} = \underline{R}_r^{-1}\underline{s}_d \quad (9)$$

where $\underline{R}_r$ is the correlation matrix of the received signal and $\underline{s}_d = E\{s^*\underline{r}\}$ is the cross correlation between the received signal vector $\underline{r}$ and the conjugate of the reference transmitted symbols, wherein the vector $\underline{s}_d$ contains the average of the channel coefficients seen by each received multi-path component. By expressing the received symbols at the output of the N fingers as $$\underline{r} = [r_1 \, r_2 \ldots r_N]^T = \underline{c}s + \underline{n} \quad (10)$$

It is possible to rewrite $\underline{s}_d$ as $$\underline{s}_d = E\{s^*\underline{r}\} = E\{s^*(\underline{c}s+\underline{n})\} = \sigma_s^2 E\{\underline{c}\} \quad (11)$$

where $\sigma_s^2$ is the power of the transmitted signal.

As shown in the foregoing, the correlation matrix is a N×N complex matrix, where N is the total number of fingers allocated to the two antennas and wherein each finger of the Rake receiver is allocated to one replica (i.e. echo) of the received signal.

In an embodiment, an HSDPA receiver with two receive antennas is used and the same number of fingers K=N/2 is allocated to each receive antenna. This configuration is normally used in the commercial HSDPA handsets and data cards of Type 1. However, those skilled in the art will appreciate that any number of receive antennas may be used.

In this case, the correlation matrix may be expressed using the following notation $$\underline{R}_r = \begin{bmatrix} \rho_{1,1}^{1,1} & \rho_{1,1}^{1,2} & \rho_{1,2}^{1,1} & \rho_{1,2}^{1,2} & \rho_{1,3}^{1,1} & \rho_{1,3}^{1,2} & \cdots & \rho_{1,K}^{1,1} & \rho_{1,K}^{1,2} \\ \rho_{1,1}^{2,1} & \rho_{1,1}^{2,2} & \rho_{1,2}^{2,1} & \rho_{1,2}^{2,2} & \rho_{1,3}^{2,1} & \rho_{1,3}^{2,2} & \cdots & \rho_{1,K}^{2,1} & \rho_{1,K}^{2,2} \\ \rho_{2,1}^{1,1} & \rho_{2,1}^{1,2} & \rho_{2,2}^{1,1} & \rho_{2,2}^{1,2} & \rho_{2,3}^{1,1} & \rho_{2,3}^{1,2} & \cdots & \rho_{2,K}^{1,1} & \rho_{2,K}^{1,2} \\ \rho_{2,1}^{2,1} & \rho_{2,1}^{2,2} & \rho_{2,2}^{2,1} & \rho_{2,2}^{2,2} & \rho_{2,3}^{2,1} & \rho_{2,3}^{2,2} & \cdots & \rho_{2,K}^{2,1} & \rho_{2,K}^{2,2} \\ \cdots & \cdots & \cdots & \cdots & \cdots & \cdots & \cdots & \cdots & \cdots \\ \cdots & \cdots & \cdots & \cdots & \cdots & \cdots & \cdots & \cdots & \cdots \\ \cdots & \cdots & \cdots & \cdots & \cdots & \cdots & \cdots & \cdots & \cdots \\ \rho_{K,1}^{1,1} & \rho_{K,1}^{1,2} & \rho_{K,2}^{1,1} & \rho_{K,2}^{1,2} & \rho_{K,3}^{1,1} & \rho_{K,3}^{1,2} & \cdots & \rho_{K,K}^{1,1} & \rho_{K,K}^{1,2} \\ \rho_{K,1}^{2,1} & \rho_{K,1}^{2,2} & \rho_{K,2}^{2,1} & \rho_{K,2}^{2,2} & \rho_{K,3}^{2,1} & \rho_{K,3}^{2,2} & \cdots & \rho_{K,K}^{2,1} & \rho_{K,K}^{2,2} \end{bmatrix} \quad (12)$$

where $\rho_{i,j}^{n,m}$ represents the correlation between the i-th echo of the n-th antenna with the j-th echo of the m-th antenna, where $1 \leq i,j \leq K$ and $1 \leq n,m \leq 2$. For instance, $\rho_{1,2}^{1,1}$ represents the correlation between the echo i=1 of the antenna n=1 with the echo j=2 of the antenna m=1. For example, the first row of the matrix contains the correlations of the first echo received on the first antenna with all the other echoes received by the two antennas (i.e. the first row is formed by the elements $\rho_{1,j}^{1,m}$). Similarly, the second row contains the correlation of the first echo received on the second antenna with the other echoes received by the two antennas (i.e. the second row is formed by the elements $\rho_{1,j}^{2,m}$).

The diagonal elements $\rho_{i,i}^{n,n}$ of the correlation matrix are characterized by the same echo index (i.e. i=j) and the same antenna index (i.e. n=m) and are representative of the powers of the various echoes. For example, the element $\rho_{1,1}^{2,2} = P_1^2$ is representative of the power of the first echo received on the second antenna.

Moreover, for the properties of the correlation, the following relation usually holds $\rho_{i,j}^{n,m} = (\rho_{j,i}^{m,n})^*$, which means that the correlation matrix $\underline{R}_r$ is Hermitian.

The correlation matrix may thus be rewritten by denoting the diagonal elements as the power of the various echoes $$\underline{R}_r = \begin{bmatrix} P_1^1 & \rho_{1,1}^{1,2} & \rho_{1,2}^{1,1} & \rho_{1,2}^{1,2} & \rho_{1,3}^{1,1} & \rho_{1,3}^{1,2} & \cdots & \rho_{1,K}^{1,1} & \rho_{1,K}^{1,2} \\ \rho_{1,1}^{2,1} & P_1^2 & \rho_{1,2}^{2,1} & \rho_{1,2}^{2,2} & \rho_{1,3}^{2,1} & \rho_{1,3}^{2,2} & \cdots & \rho_{1,K}^{2,1} & \rho_{1,K}^{2,2} \\ \rho_{2,1}^{1,1} & \rho_{2,1}^{1,2} & P_2^1 & \rho_{2,2}^{1,2} & \rho_{2,3}^{1,1} & \rho_{2,3}^{1,2} & \cdots & \rho_{2,K}^{1,1} & \rho_{2,K}^{1,2} \\ \rho_{2,1}^{2,1} & \rho_{2,1}^{2,2} & \rho_{2,2}^{2,1} & P_2^2 & \rho_{2,3}^{2,1} & \rho_{2,3}^{2,2} & \cdots & \rho_{2,K}^{2,1} & \rho_{2,K}^{2,2} \\ \cdots & \cdots & \cdots & \cdots & \cdots & \cdots & \cdots & \cdots & \cdots \\ \cdots & \cdots & \cdots & \cdots & \cdots & \cdots & \cdots & \cdots & \cdots \\ \cdots & \cdots & \cdots & \cdots & \cdots & \cdots & \cdots & \cdots & \cdots \\ \rho_{K,1}^{1,1} & \rho_{K,1}^{1,2} & \rho_{K,2}^{1,1} & \rho_{K,2}^{1,2} & \rho_{K,3}^{1,1} & \rho_{K,3}^{1,2} & \cdots & P_K^1 & \rho_{K,K}^{1,2} \\ \rho_{K,1}^{2,1} & \rho_{K,1}^{2,2} & \rho_{K,2}^{2,1} & \rho_{K,2}^{2,2} & \rho_{K,3}^{2,1} & \rho_{K,3}^{2,2} & \cdots & \rho_{K,K}^{2,1} & P_K^2 \end{bmatrix} \quad (13)$$

In an embodiment, the correlation matrix $\underline{R}_r$ is estimated in an HSDPA receiver by means of the pilot symbols transmitted on the Common Pilot Channel (CPICH). For example, the correlation coefficient $\rho_{i,j}^{n,m}$ may be calculated with the following formula $$\rho_{i,j}^{n,m} = \frac{1}{Q}\sum_{k=0}^{Q-1} c_i^n(k) \cdot [c_j^m(k)]^* \quad (14)$$

where Q is the number of CPICH symbols in the considered time interval (e.g. Q=30 in a TTI interval of 2 ms), $c_i^n(k)$ is the vector that contains the CPICH pilot symbols at the output of the i-th finger of the n-th antenna, and $c_j^m(k)$ is the vector that contains the CPICH pilot symbols at the output of the j-th finger of the m-th antenna.

In an embodiment, the elements of the vector $\underline{s}_d$ are estimated by averaging the channel coefficients over the same time interval. For example, the averaged channel coefficient of the i-th path received on the n-th antenna is calculated as $$<c_i^n> = \frac{1}{Q}\sum_{k=0}^{Q-1} c_i^n(k) \quad (15)$$

In an embodiment, the ordering of the elements in the vector $\underline{s}_d$ is done accordingly to the ordering used in the correlation matrix, and thus the vector is formed as shown below $$\underline{s}_d = \begin{bmatrix} <c_1^1> \\ <c_1^2> \\ <c_2^1> \\ <c_2^2> \\ <c_3^1> \\ <c_3^2> \\ \cdots \\ <c_K^1> \\ <c_K^2> \end{bmatrix} \quad (16)$$

In an embodiment, an approximation of the correlation matrix $\underline{R}_r$ is used, which may be inverted avoiding complex operations.

In an embodiment, the correlation matrix is approximated by neglecting the correlations between echoes that have different delays and this approximation is applied to echoes received on both the same and on different antennas. By using this approximation, the number of correlations to be calculated in the receiver is reduced with a respective reduction of the computational complexity.

The approximation simplifies the structure of the correlation matrix, which becomes block diagonal as shown, for example, in the case of a multi-path channel with K=2 echoes $$\underline{R}_r = \begin{bmatrix} \rho_{11}^{11} & \rho_{11}^{12} & 0 & 0 \\ \rho_{11}^{21} & \rho_{11}^{22} & 0 & 0 \\ 0 & 0 & \rho_{22}^{11} & \rho_{22}^{12} \\ 0 & 0 & \rho_{22}^{21} & \rho_{22}^{22} \end{bmatrix} = \begin{bmatrix} \underline{R}_1 & 0 \\ 0 & \underline{R}_2 \end{bmatrix} \quad (17)$$

In an embodiment, the number of received echoes is equal to K, and the approximated correlation matrix is formed by K sub-blocks of size 2×2.

The block diagonal structure permits a simplification of the matrix inversion. In fact, the inverse of a block diagonal matrix is still a block diagonal matrix and can be obtained by inverting separately each sub-block, as shown below for the general case of K echoes $$\underline{R}_r^{-1} = \begin{bmatrix} \underline{R}_1 & \underline{0} & \underline{0} & \underline{0} \\ \underline{0} & \underline{R}_2 & \underline{0} & \underline{0} \\ \underline{0} & \underline{0} & \cdots & \underline{0} \\ \underline{0} & \underline{0} & \underline{0} & \underline{R}_K \end{bmatrix}^{-1} = \begin{bmatrix} \underline{R}_1^{-1} & \underline{0} & \underline{0} & \underline{0} \\ \underline{0} & \underline{R}_2^{-1} & \underline{0} & \underline{0} \\ \underline{0} & \underline{0} & \cdots & \underline{0} \\ \underline{0} & \underline{0} & \underline{0} & \underline{R}_K^{-1} \end{bmatrix} \quad (18)$$

Those skilled in the art will appreciate that the inversion of a 2×2 matrix requires only some simple mathematical operation. For example, given a generic 2×2 matrix $\underline{A}$ $$\underline{A} = \begin{bmatrix} a & b \\ c & d \end{bmatrix} \quad (19)$$

the inverse matrix is equal to $$\underline{A}^{-1} = \frac{1}{\det(\underline{A})} \begin{bmatrix} d & -b \\ -c & a \end{bmatrix} \quad (20)$$

where $\det(\underline{A})$ is the determinant of the matrix $\underline{A}$ (namely ad−cb).

In an embodiment, the inverse of each sub-block with size 2×2 is computed, but no division is performed with the determinant of each sub-block. This aspect may be important, because the division with the determinant of each sub-block may hide the respective power levels of the different echoes, which may thus result in a significant performance degradation. As a consequence given the approximated correlation matrix shown below $$\underline{R}_r = \begin{bmatrix} P_1^1 & \rho_{1,1}^{1,2} & 0 & 0 & 0 & 0 & \cdots & 0 & 0 \\ \rho_{1,1}^{2,1} & P_1^2 & 0 & 0 & 0 & 0 & \cdots & 0 & 0 \\ 0 & 0 & P_2^1 & \rho_{2,2}^{1,2} & 0 & 0 & \cdots & 0 & 0 \\ 0 & 0 & \rho_{2,2}^{2,1} & P_2^2 & 0 & 0 & \cdots & 0 & 0 \\ \cdots & \cdots & \cdots & \cdots & \cdots & \cdots & \cdots & \cdots & \cdots \\ \cdots & \cdots & \cdots & \cdots & \cdots & \cdots & \cdots & \cdots & \cdots \\ \cdots & \cdots & \cdots & \cdots & \cdots & \cdots & \cdots & \cdots & \cdots \\ 0 & 0 & 0 & 0 & 0 & 0 & \cdots & P_K^1 & \rho_{K,K}^{1,2} \\ 0 & 0 & 0 & 0 & 0 & 0 & \cdots & \rho_{K,K}^{2,1} & P_K^2 \end{bmatrix} \quad (21)$$

the inverse of the approximated correlation matrix may be calculated by performing only sign inversions and element swapping:

$$(\underline{R}_r)^{-1} = \begin{bmatrix} P_1^2 & -\rho_{1,1}^{1,2} & 0 & 0 & 0 & 0 & \cdots & 0 & 0 \\ -\rho_{1,1}^{2,1} & P_1^1 & 0 & 0 & 0 & 0 & \cdots & 0 & 0 \\ 0 & 0 & P_2^2 & -\rho_{2,2}^{1,2} & 0 & 0 & \cdots & 0 & 0 \\ 0 & 0 & -\rho_{2,2}^{2,1} & P_2^1 & 0 & 0 & \cdots & 0 & 0 \\ \cdots & \cdots & \cdots & \cdots & \cdots & \cdots & \cdots & \cdots & \cdots \\ \cdots & \cdots & \cdots & \cdots & \cdots & \cdots & \cdots & \cdots & \cdots \\ \cdots & \cdots & \cdots & \cdots & \cdots & \cdots & \cdots & \cdots & \cdots \\ 0 & 0 & 0 & 0 & 0 & 0 & \cdots & P_K^2 & -\rho_{K,K}^{1,2} \\ 0 & 0 & 0 & 0 & 0 & 0 & \cdots & -\rho_{K,K}^{2,1} & P_K^1 \end{bmatrix} \quad (22)$$

The inverse of the approximated correlation matrix, calculated according to equation (18) or (22), is then multiplied by the vector $\underline{s}_d$, given by the equation (16) in order to obtain the MMSE approximated weights.

These weights may then be used to combine the data symbols of e.g. the HS-DSCH channel obtained after de-spreading.

Figure 2:
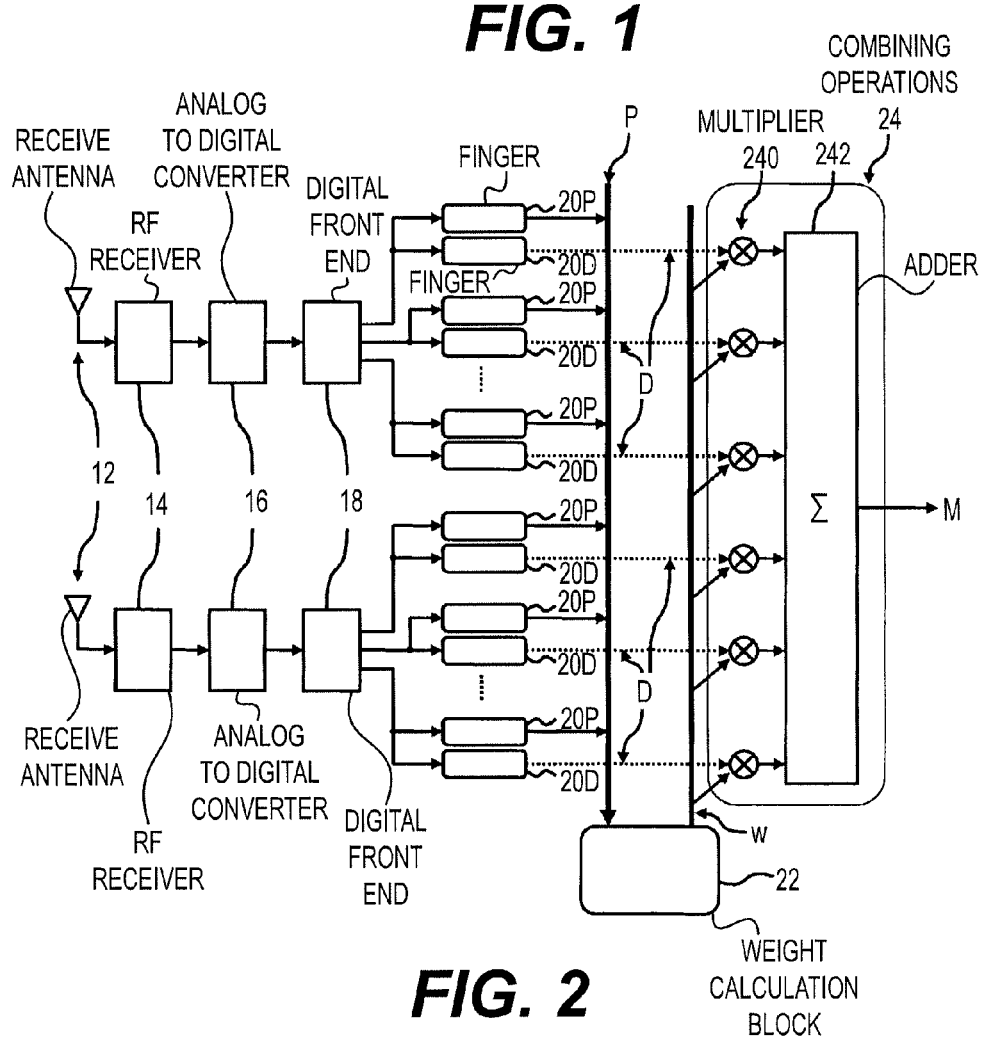
FIGS. 2 and 3 are block diagrams of HSDPA Type 1 receivers incorporating the proposed approximated MMSE combining technique.

FIG. 2 shows a first possible embodiment of a Type 1 receiver that incorporates the above explained approximate MMSE techniques for demodulating one particular OVSF code of the HS-DSCH.

In the exemplary embodiment illustrated, the receiver comprises 2 receive antennas 12, which are connected to respective RF receivers 14, analog to digital converters 16, and digital front ends 18.

In this case, the receiver may comprise N=2 K fingers 20P for de-spreading the CPICH common pilot channel, and N fingers 20D for de-spreading the single OVSF code of the HS-DSCH data channel.

The pilot CPICH symbols are provided then on the finger outputs designate P, while the HS-DSCH data symbols are provided on the finger outputs designate D.

In an embodiment, the Q pilot symbols over a given time interval (for example one TTI) feed a block 22 that calculates the combining weights w.

In an embodiment, block 22 uses the approximated MMSE technique disclosed in the foregoing.

The combining weights w are then combined with the data symbols D in a block 24 and are sent to an outer modem M (not shown).

In an embodiment, block 24 comprises a set of multipliers 240 for weighing the data symbols D with the respective combining weights w and an adder 242 for summing the weighed data symbols.

In an embodiment, support for multiple OVSF codes of the HS-DSCH is achieved (for example 5 or 10 OVSF codes) by providing for each OVSF code N fingers. For example in the case of a Type 1 receiver employing the architecture shown in FIG. 2 and demodulating five OVSF codes, in correspondence to every finger P demodulating the CPICH channel are associated five data fingers D demodulating five different OVSF codes of the HS-DSCH channel dedicated to the considered user.

Figure 3:
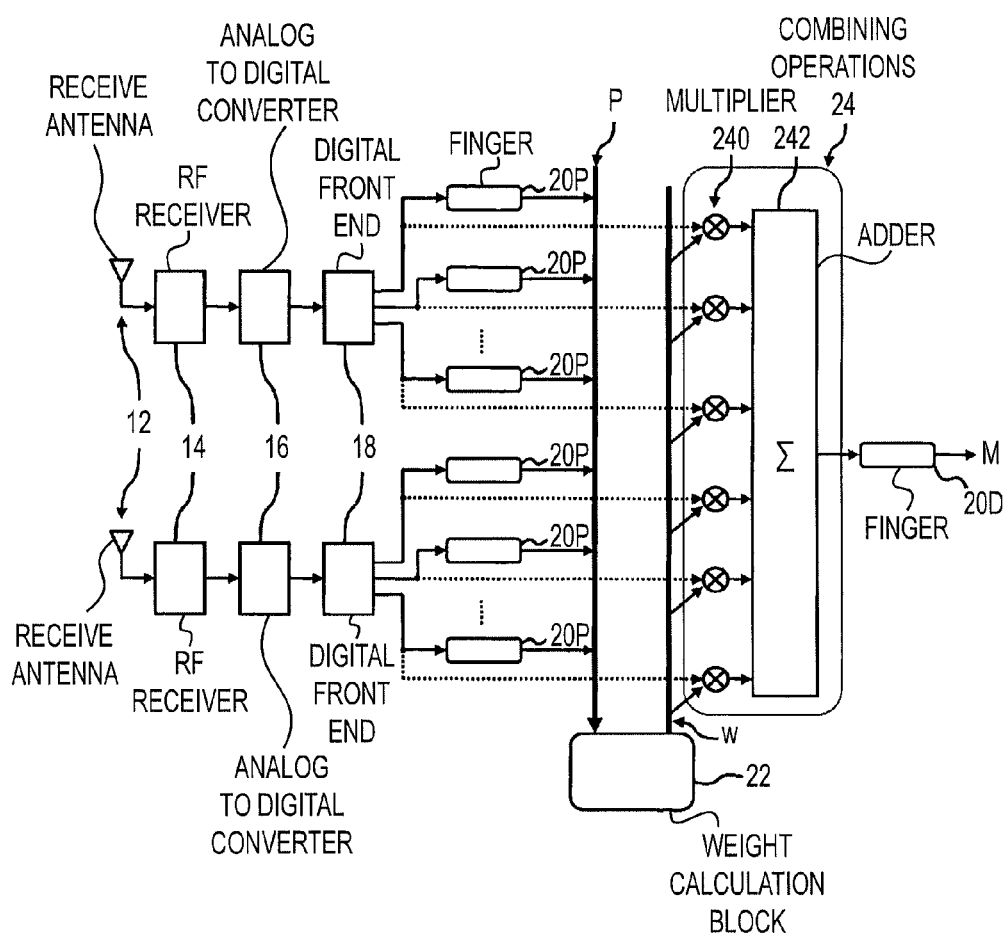

FIG. 3 shows a second embodiment of a Type 1 receiver that incorporates the approximate MMSE technique for demodulating a particular OVSF code of the HS-DSCH.

In this case, the calculation of the combining weights w is still performed at symbol level by using the pilot symbols after de-spreading, but the combination of the different multipath components is performed at chip level on the signals available at the output of the digital front-end.

The separation of the various physical channels is performed after the combining operation in block 24 by means of one finger 20D tuned on the particular OVSF code of the data HS-DSCH channel.

This embodiment requires only a single finger 20D for de-spreading the data channel. Such a complexity reduction may be important for HSDPA systems, because the data channel uses OVSF code multiplexing with up to 15 codes allocated to one user in each TTI.

In an embodiment, the weights calculated with the approximated MMSE technique are used to initialize a Least Mean Squares (LMS) or a Normalized Least Mean Square (NLMS) iterative procedure. This embodiment may improve performance and the convergence behaviour of the LMS/NLMS.

LMS Initialized by the Approximated MMSE

The exact MMSE technique can be implemented in iterative form by using techniques such as Least Mean Squares (LMS) in order to avoid complicate matrix inversion.

As mentioned already in the foregoing, the LMS technique has usually a slow convergence speed and requires a large number of iterations. However, only a limited number of pilot symbols may be available after de-spreading. For example, in case of the HSDPA system the number of CPICH pilot symbols available in one TTI is equal to 30, which means that only 30 LMS iterations may be performed.

The convergence of the LMS technique may thus be improved by initializing the weights with values close to the optimum.

For instance, while the article by R. M. Shubair cited in the introductory portion of this description uses a Sample Matrix Inversion (SMI) to initialize a LMS algorithm, with its associated complexity for inverting the correlation matrix, in an embodiment of this disclosure, the above explained approximate MMSE technique is used to initialize a LMS or Normalized LMS (NLMS) procedure.

Figure 4:
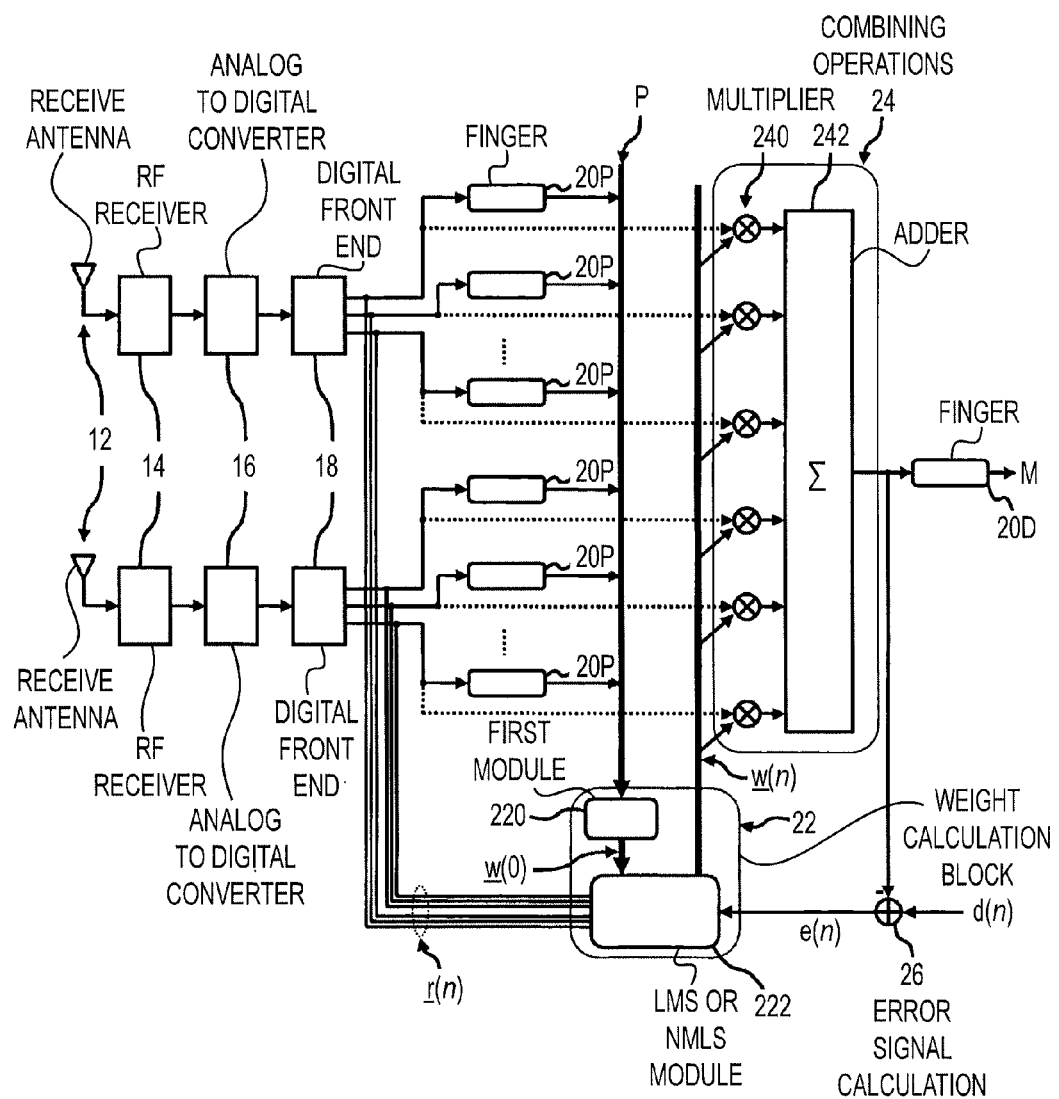
FIG. 4 is the block diagram of a HSDPA Type 1 receiver, which uses the proposed approximated MMSE technique to initialize a NLMS procedure.

FIG. 4 shows in that respect a possible embodiment of a Type 1 receiver, wherein the weight calculation block 22 comprises a first module 220, which implements the approximated MMSE technique disclosed in the foregoing, and a LMS or NLMS module 222.

In the exemplary embodiment illustrated in FIG. 4, a NLMS procedure is used, which operates at chip level directly on the signals provided at the output of the digital front-ends 18 and also the combining operations 24 are performed at chip level.

Those skilled in the art will appreciate that the same concepts may also be applied when the NLMS procedure and/or the combining operations are performed at symbol level. However, operating on chip level may have some significant advantages. First, only one finger 20D is required for the demodulation of one particular OVSF code of the HS-DSCH data channel. A second advantage is that the NLMS procedure implemented at chip level may track channel variations better, because the LMS/NLMS procedure may execute one iteration and update the combining weights for each received chip.

In an embodiment, the NLMS module 222 receives three inputs signals:
the received chip level signals $\underline{r}(n)$ of the different multipath replicas from the digital-front-ends 18;
the error signal e(n) from a block 26, which may be obtained as the difference between the recombined chip level signal being output by the block 24 and the reference pilot signal d(n) regenerated at chip level in the receiver; and
the initial value of the combining weights $\underline{w}(0)$ calculated by module 220 with the approximated MMSE technique.

The NLMS module 222 provides at its output the weight coefficients $\underline{w}(n)$ that are used for the recombination of the different signal replicas in block 24.

In an embodiment, the NLMS technique is used and the combining weights are updated iteratively according to the following equation:

$$\underline{w}(n+1) = \underline{w}(n) + \frac{\mu \underline{r}(n) e(n)^*}{\underline{r}(n)^H \underline{r}(n)} \tag{23}$$

where $\underline{w}(n)=[w_1(n), w_2(n), \ldots, w_N(n)]^T$ is the weight vector at the discrete time n, e(n) is the error signal, $\underline{r}(n)=[r_1(n), r_2(n), \ldots, r_N(n)]^T$ is the chip level received signal and μ is the step that controls the convergence speed of the algorithm.

In an embodiment, the error signal e(n) is computed as the difference between the reference CPICH signal d(n), regenerated at chip level in the receiver, and the recombined signal:

$$e(n)=d(n)-\underline{w}(n)^H\underline{r}(n) \quad (24)$$

The reference CPICH signal may be given by the following equation:

$$d(n)=a\cdot v(n) \quad (25)$$

where $a=(1+j)/\sqrt{2}$ is the baseband symbols transmitted on the CPICH channel and v(n) is the scrambling code sequence of the HSDPA serving cell.

The convergence speed of the NLMS technique depends on the parameter μ. When μ is large the algorithm converges faster, but is usually less precise in reaching the optimal weights. Conversely, when μ is small, the convergence to the optimal weights is usually more precise but also slower.

In an embodiment, the initial NLMS weights are set according to the equation below $$\underline{w}(0) = \frac{\underline{w}_{mmse\_approx}}{\gamma} \quad (26)$$

where $\underline{w}_{mmse\_approx}$ are the weights calculated with the approximated MMSE technique and γ is a real positive constant (i.e. $\gamma \in \mathfrak{R}$ and $\gamma > 0$) that may be used to adapt the amplitude of the MMSE approximated weights to the level of the reference signal d(n) regenerated in the UE receiver.

The proposed initialization reduces significantly the convergence time of the NLMS algorithm and allows the utilization of a small value for the parameter μ. The reduction of the NLMS convergence time may be used e.g. to reduce the power consumption of the mobile terminal and thus provides a correspondent increase in battery lifetime.

In an embodiment, the calculation of the approximated MMSE weights is performed in block 220 during a time interval $T_1$ before any data is received.

These weights are then used to initialize the NLMS module 222, which may require then only a limited number of iterations during a time interval $T_2$ in order to converge to the optimal weights.

Figure 5:
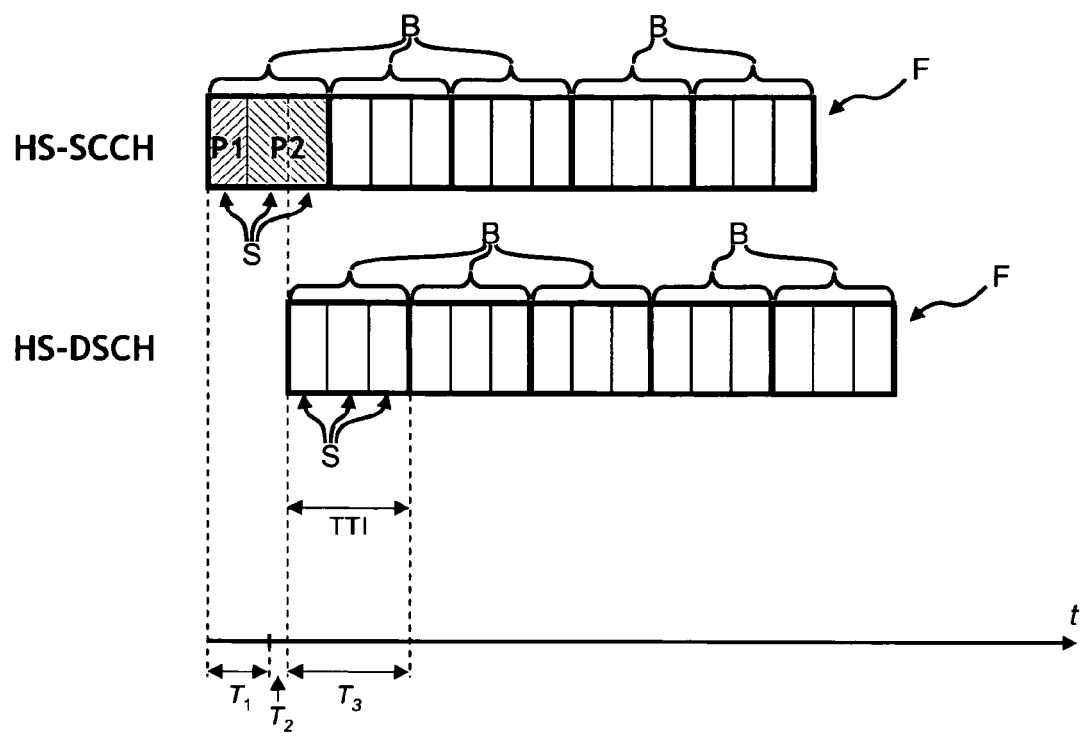
FIG. 5 shows a possible timing of the proposed technique.

FIG. 5 shows in that respect a possible timing at the example of the HS-SCCH and HS-DSCH, which had already been described with respect to FIG. 1.

In an embodiment, the time interval $T_1$ correspondent to at least 10 CPICH symbols (i.e. one timeslot), which is usually sufficient for calculating representative initial weights.

Similarly, also the iterations in the time interval $T_2$ may be performed before any data is received. The time interval $T_2$ is usually very short, and thus the duration of e.g. 1 CPICH symbol may be sufficient.

For example, in a typical Pedestrian A channel (v=3 km/h) and a HS-DSCH transport format having 10 codes and QPSK modulation (i.e. TBS=7168 bits) the NLMS procedure may converge in about 200-300 iterations.

In the exemplary embodiment shown in FIG. 5, $T_1$ starts immediately with the receipt of the first slot on the HS-SCCH and may have a duration of up to 19 CPICH symbols, while the duration of the time interval $T_2$ is 1 CPICH symbol.

Contemporarily with the beginning of the following demodulation of the HS-DSCH starts also a time interval $T_3$. Specifically, during the interval $T_3$, the NLMS module 222 tracks the channel variations by updating the weights $\underline{w}(n)$ e.g. on a chip-by-chip basis, as described by the equations (23) and (24).

Figure 6:
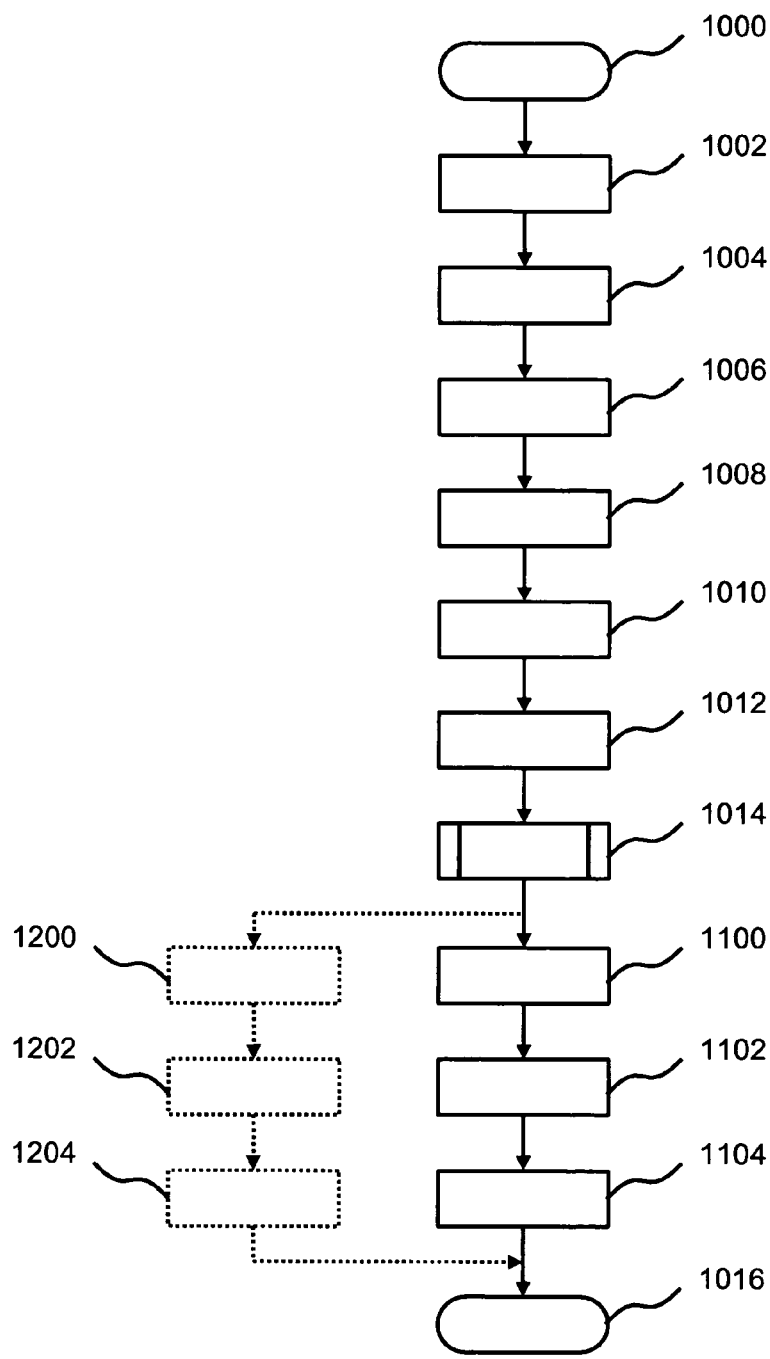
FIG. 6 is a flow chart illustrating in detail the steps of the proposed technique.

FIG. 6 shows in that respect a flow chart summarizing the steps of the proposed technique for estimating the combining weights in a receive diversity antenna system from pilot signals.

After a start step 1000, the multi-path components of the received signal $\underline{r}$ are detected at step 1002. This operation may be performed e.g. by the digital-front-end 18.

Subsequently, the pilot signals are detected in the multi-path components of the received signal r at a step 1004. In the case of a CDMA system, the detection of the pilot signals may be performed by de-spreading the pilot signals in the fingers 20P.

The detected pilot signals are then used to compute the channel coefficients or the channel coefficient vector $\underline{c}$ at a step 1006. For example, this may be done by multiplying the received signal vector $\underline{r}$ with the conjugate of the reference transmitted symbol.

At a step 1008, the spatial correlation matrix $\underline{R}_r$ of the channel coefficient vector $\underline{c}$ is computed. The coefficients of the correlation matrix may also be averaged over a predetermined time interval as shown in equation (14).

Specifically, correlations between multi-path components of the channel coefficient vector having different delays are neglected. This operation renders the correlation matrix a block diagonal matrix comprising null coefficients other than non-null sub-matrixes arranged along the diagonal of the matrix, wherein the sub-matrixes have a size equal to the number of receive diversity antennas.

The structure of the approximated correlation matrix allows for inverting the spatial correlation matrix by calculating separately the inverse of the sub-matrixes at a step 1010. Specifically, in an embodiment which is particularly suitable for HSDPA systems having two diversity antennas, the sub-matrixes are inverted by performing only sign inversions and element swapping, omitting any calculation of the determinant of the sub-block, and any division of the inverted sub-blocks by the determinant. Generally, scaled versions of the inverted sub-matrixes may be used, wherein the scaling factor may also be equal to one.

Finally, the inverted spatial correlation matrix may be multiplied with the channel coefficient vector at a step 1012 in order to obtain the combining weights $\underline{w}$. Also an averaged version $\underline{s}_d$ of the channel coefficient vector may be used as shown in equation (9).

The combining weights $\underline{w}$ may then be used in various possible ways.

In a first embodiment, the combining weights $\underline{w}$ may be multiplied at a step 1100 with the multi-path components of the received signal $\underline{r}$. This operation may be performed e.g. by the multipliers 240 shown in FIG. 3.

The result of the multiplications may then be summed at a step 1102 in order to obtain a multi-path free version of received signal. This operation may be performed e.g. by block 242 shown in FIG. 3.

Finally, the data signal may be detected in the multi-path free version of the received signal at a step 1104. This operation may be performed e.g. by the finger 20D shown in FIG. 3.

In a second embodiment, the data signals are detected in the multi-path components of the received signal at a step 1200. This operation may be performed e.g. by the fingers 20D shown in FIG. 2.

The combining weights are then multiplied with the multi-path components of the data signal at a step 1202, and the result of the multiplications is summed at a step 1204 in order to obtain a multi-path free version the data signal. These operations may be performed e.g. by the multipliers 240 and block 242 shown in FIG. 2.

Again, in the case of a CDMA system, the detection of the data signals e.g. in the fingers 20D may be performed by de-spreading the data signals.

Finally, the procedure terminates at a step 1016.

The combining weights $\underline{w}$ may also be used to initializing an iterative channel tracking procedure 1014, such as a Least Mean Square (LMS) or Normalized Least Mean Square (NLMS) iterative procedure. The iterative channel tracking procedure may then track channel variations during data reception by updating the combining weights $\underline{w}$. Also, a number of iterations of the iterative channel tracking procedure may be performed before any data are received in order to obtaining already refined versions of the combining weights $\underline{w}$.

Consequently, without prejudice to the underlying principles of the invention, the details and the embodiments may vary, even appreciably, with respect to what has been described by way of example only, without departing from the scope of the invention as defined by the annexed claims.

The invention claimed is:

1. A method of processing signals received from channels exposed to multi-path propagation via a plurality of diversity antennas, each of said received signals comprising at least one pilot signal, comprising:
    detecting a set of multi-path components for each of said received signals;
    detecting said at least one pilot signal from a plurality of multi-path components in said set of multi-path components;
    computing a set of channel coefficients from said multi-path components used to detect said at least one pilot signal, said set of channel coefficients being organized as a channel coefficient vector; and
    estimating from said channel coefficient vector a set of combining weights to be applied to said received signals, said estimating from said channel coefficient vector a set of combining weights comprising:
    computing a spatial correlation matrix of said channel coefficient vector by neglecting the correlations between multi-path components of said channel coefficient vector having different delays, whereby said correlation matrix is a block diagonal matrix comprising null coefficients other than for non-null sub-matrixes arranged along the diagonal of said correlation matrix, wherein said sub-matrixes have a size equal to the number of said diversity antennas, wherein two diversity antennas are used;
    deriving from said spatial correlation matrix a resulting matrix by calculating the inverse of said sub-matrixes or a scaled version thereof by performing only sign inversions and element swapping, wherein calculating the determinant of said sub-blocks and dividing the inverted sub-blocks by said determinants are omitted; and
    multiplying said resulting matrix and said channel coefficient vector in order to obtain said set of combining weights.

2. The method of claim 1, comprising averaging the coefficients of said correlation matrix over a predetermined time interval.

3. The method of claim 1, comprising averaging the coefficients of said channel coefficient vector, said resulting matrix being multiplied with said averaged channel coefficient vector in order to obtain said set of combining weights.

4. The method of claim 1, wherein at least one of said received signals comprises at least one data signal, and wherein the method comprises:
    multiplying said set of combining weights with said set of multi-path components of said received signal, and summing the result of said multiplications in order to obtain a multi-path free version of said received signal; and
    detecting said at least one data signal in said multi-path free version of said received signal.

5. The method of claim 1, wherein at least one of said received signals comprises at least one data signal, and wherein the method comprises:
    detecting multi-path components of said at least one data signal in said set of multi-path components of said received signal; and
    multiplying said set of combining weights with said multi-path components of said at least one data signal, and summing the result of said multiplications in order to obtain a multi-path free version of said data signal.

6. The method of claim 1, wherein at least one of said received signals comprises at least one data signal, and wherein said at least one pilot signal and said at least one data signal are spread with at least one orthogonal variable spreading factor, and wherein the method comprises detecting said at least one pilot signal and said at least one data signal, wherein said detecting involves de-spreading said at least one pilot signal and said at least one data signal.

7. The method of claim 1, comprising:
    initializing an iterative channel tracking procedure with said set of combining weights; and
    tracking channel variations during data reception by updating said combining weights with said iterative channel tracking procedure.

8. The method of claim 7, wherein initializing an iterative channel tracking procedure with said set of combining weights comprises performing a number of iterations of said iterative channel tracking procedure before any data are received in order to obtain refined versions of said combining weights to be applied to said received signals.

9. The method of claim 7, wherein said iterative channel tracking procedure is a least mean square or normalized least mean square iterative procedure.

10. The method of claim 7, wherein said iterative channel tracking procedure operates directly on said multi-path components of said received signal.

11. A receiver for receiving signals from channels exposed to multi-path propagation via a plurality of diversity antennas, said received signals comprising at least one pilot signal, wherein the receiver is configured for performing a method comprising:
    detecting a set of multi-path components for each of said received signals;
    detecting said at least one pilot signal from a plurality of multi-path components in said set of multi-path components;
    computing a set of channel coefficients from said multi-path components used to detect said at least one pilot signal, said set of channel coefficients being organized as a channel coefficient vector; and
    estimating from said channel coefficient vector a set of combining weights to be applied to said received signals, said estimating from said channel coefficient vector a set of combining weights comprising:
    computing a spatial correlation matrix of said channel coefficient vector by neglecting the correlations between multi-path components of said channel coefficient vector having different delays, whereby said correlation matrix is a block diagonal matrix comprising null coefficients other than for non-null sub-matrixes arranged along the diagonal of said correlation matrix, wherein said sub-matrixes have a size equal to the number of said diversity antennas, wherein two diversity antennas are used;

deriving from said spatial correlation matrix a resulting matrix by calculating the inverse of said sub-matrixes or a scaled version thereof by performing only sign inversions and element swapping, wherein calculating the determinant of said sub-blocks and dividing the inverted sub-blocks by said determinants are omitted; and multiplying said resulting matrix and said channel coefficient vector in order to obtain said set of combining weights.

12. The receiver of claim 11, wherein said receiver is a high speed packet access receiver.

13. A non-transitory computer readable medium containing a computer program product loadable into the memory of a computer and comprising software code portions that when executed on the computer perform a method comprising:

detecting a set of multi-path components for each of said received signals;

detecting said at least one pilot signal from a plurality of multi-path components in said set of multi-path components;

computing a set of channel coefficients from said multi-path components used to detect said at least one pilot signal, said set of channel coefficients being organized as a channel coefficient vector; and estimating from said channel coefficient vector a set of combining weights to be applied to said received signals, said estimating from said channel coefficient vector a set of combining weights comprising:

computing a spatial correlation matrix of said channel coefficient vector by neglecting the correlations between multi-path components of said channel coefficient vector having different delays, whereby said correlation matrix is a block diagonal matrix comprising null coefficients other than for non-null sub-matrixes arranged along the diagonal of said correlation matrix, wherein said sub-matrixes have a size equal to the number of said diversity antennas, wherein two diversity antennas are used;

deriving from said spatial correlation matrix a resulting matrix by calculating the inverse of said sub-matrixes or a scaled version thereof by performing only sign inversions and element swapping, wherein calculating the determinant of said sub-blocks and dividing the inverted sub-blocks by said determinants are omitted; and multiplying said resulting matrix and said channel coefficient vector in order to obtain said set of combining weights.

* * * * *